United States Patent
Fukuda et al.

[11] Patent Number: 6,103,368
[45] Date of Patent: Aug. 15, 2000

[54] ANTISTATIC POLYESTER FILM AND ANTISTATIC FILM LAMINATE

[75] Inventors: Masayuki Fukuda; Satoshi Kitazawa, both of Sagamihara; Shin-ichiro Okada, Sahamihara; Hiroshi Tomita, Sagamihara, all of Japan

[73] Assignee: Teijin Ltd., Japan

[21] Appl. No.: 09/029,515

[22] PCT Filed: Jul. 7, 1997

[86] PCT No.: PCT/JP97/02341

§ 371 Date: Feb. 27, 1998

§ 102(e) Date: Feb. 27, 1998

[87] PCT Pub. No.: WO98/02308

PCT Pub. Date: Jan. 22, 1998

[30] Foreign Application Priority Data

Jul. 12, 1996 [JP] Japan .................................. 8-183177

[51] Int. Cl.[7] .......................... B32B 27/08; B32B 27/30; B32B 27/36; C08L 39/04; C08F 20/58
[52] U.S. Cl. .......................... 428/337; 428/483; 428/692; 428/694 SL; 525/204; 526/287; 526/288; 526/292.9; 526/304
[58] Field of Search ...................... 428/480, 483, 428/692, 922, 337, 694 SL, 694 TS, 694 BS; 526/260, 287, 288, 292.9, 304; 525/204

[56] References Cited

U.S. PATENT DOCUMENTS 4,784,896  11/1988  Matsunaga et al. ..................... 428/215
5,573,996  11/1996  Inoue ..................... 503/208

FOREIGN PATENT DOCUMENTS 3-255139  11/1991  Japan .
4-28728  1/1992  Japan .
4-288217  10/1992  Japan .
5-320390  12/1993  Japan .
6-172562  6/1994  Japan .
8-156207  6/1996  Japan .

OTHER PUBLICATIONS

Mark et al., Encyclopedia of Polymer Science, vol. 1: Additives, pp. 472–475, Aug. 1985.

*Primary Examiner*—Paul Thibodeau
*Assistant Examiner*—Ramsey Zacharia
*Attorney, Agent, or Firm*—Rader, Fishman & Grauer

[57] ABSTRACT

The present invention provides an antistatic polyester film having an antistatic layer formed of an antistatic agent (A) composed mainly of a polymer having a recurring unit of a structure expressed by the following formula (I) on at least one surface of a polyester film

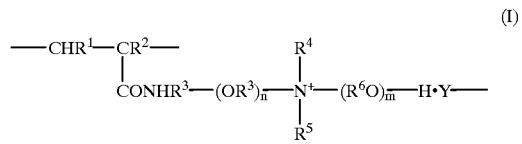

wherein $R^1$ and $R^2$ are each H or $CH_3$, $R^3$ is an alkylene group having a carbon number of 2 to 10, $R^4$ and $R^5$ are each a saturated hydrocarbon group having a carbon number of 1 to 5, $R^6$ is an alkylene group having a carbon number of 2 to 5, n is a number of 0 to 40, m is a number of 1 to 40, and $Y^-$ is a halogen ion, a mono- or polyhalogenated alkyl ion, nitrate ion, sulfate ion, an alkylsulfate ion, sulfonate ion or an alkylsulfonate ion.

14 Claims, No Drawings

ANTISTATIC POLYESTER FILM AND ANTISTATIC FILM LAMINATE

DETAILED DESCRIPTION OF THE INVENTION

1. Technical Field

This invention relates to an antistatic polyester film, more particularly to an antistatic polyester film having excellent antistaticity, back-transfer resistance, chipping resistance, blocking resistance and reclaimability and suitable for magnetic cards (for example telephone card or prepaid card), electronic materials, graphic materials, graphic arts films, OHP films, magnetic recording materials (for example magnetic tapes such as audio tape or video tape or magnetic disks such as floppy disk), etc., especially for magnetic cards.

2. Background Art

Polyester films made of a polyester such as polyethylene terephthalate or polyethylene 2,6-naphthalate are widely in use as a film for magnetic card, general industrial materials such as a packaging material, a photographic material or a graphic material and magnetic recording materials such as a magnetic recording tape. However, these polyesters have defects of high surface resistivity to readily accumulate static charge by friction, etc. Accumulation of static charge on a polyester film induces the deposition of dust on the film surface and causes the problem of product deficiency. Further, a spark discharge may occur during the production or the processing of the film to arise the problem of ignition hazard when an organic solvent is used in the above procedures.

Various methods for forming an antistatic layer on the film surface have been proposed and put into practical use as a means for preventing the problems caused by the static charge accumulation of these films. The formation of an antistatic layer on a film surface is usually performed by coating the film surface with a coating liquid containing an antistatic agent.

Low-molecular weight compounds and high-polymer compounds are known as the antistatic agents to be included in the antistatic coating film, and each type of the antistatic agent has respective merits and demerits. Accordingly, the low-molecular antistatic agent and the high-polymer antistatic agent are properly used according to the use of the product.

Known antistatic agents and their characteristics are described below.

Surfactant-type anionic antistatic agents such as a long-chain alkyl compound having a sulfonic acid salt group (Japanese Patent TOKKAIHEI 4-28728) are known as the low-molecular antistatic agent, and polymers having ionized nitrogen element on the main chain (Japanese Patents TOKKAIHEI 3-255139, 4-288217 and 6-172562) or a polystyrene modified with a sulfonic acid salt (Japanese Patent TOKKAIHEI 5-320390) are known as the high-polymer antistatic agent.

The use of a low-molecular antistatic agent may cause the migration of a part of the antistatic agent in the antistatic film through the coating film layer and the accumulation of the agent to the interface between the coating film and the base film and, for example in the case of winding the film in the form of a roll, produce a problem of the transfer of the antistatic agent to the reverse face of the antistatic film (back transfer) and the deterioration of the antistatic effect with time. As for the high-polymer antistatic agent, it is necessary to form a thick antistatic layer for getting sufficient antistatic effect to necessitate a large amount of the antistatic agent and increase the cost.

Another problem is the thermal deterioration of the coating film component in the reclaimed material during a film-forming process to give a considerably colored film unsuitable for practical use in the case of reclaiming a scrap film (for example, slit edge of the film in the production of an antistatic film) and using as a reclaimed material for the production of a film.

Furthermore, these antistatic agents cause various problems such as the tendency of blocking (a phenomenon to cause the adhesion of films in a hardly peelable state in the case of stacking films over a long period) and the readily peelable antistatic layer.

DISCLOSURE OF INVENTION

The first object of the present invention is to solve the problems of the prior arts and provide an antistatic polyester film having excellent antistaticity, back-transfer resistance, reclaimability, chipping resistance and blocking resistance.

The second problem of the present invention is to provide an antistatic film laminate A resistant to the deposition of dust caused by the static charge of the film during the production of the film or film laminate, useful as a magnetic card and produced by laminating a magnetic layer on one surface of the above antistatic polyester film.

The third object of the present invention is to provide an antistatic film laminate B having excellent ink receptivity by applying an ultraviolet curable ink layer to a face opposite to the magnetic layer face of the antistatic film laminate A.

BEST MODE FOR CARRYING OUT THE INVENTION

According to the investigation performed by the inventors of the present invention, the objects of the present invention can be achieved by an antistatic polyester film having an antistatic layer composed of an antistatic agent (A) composed mainly of a polymer having the recurring unit of the structure expressed by the following formula (I) on at least one surface of a polyester film.

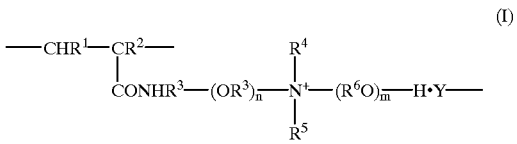

(I)

In the formula (I), $R^1$ and $R^2$ are each H or $CH_3$, $R^3$ is an alkylene group having a carbon number of 2 to 10, $R^4$ and $R^5$ are each a saturated hydrocarbon group having a carbon number of 1 to 5, $R^6$ is an alkylene group having a carbon number of 2 to 5, n is a number of 0 to 40, m is a number of 1 to 40, and $Y^-$ is a halogen ion, a mono- or polyhalogenated alkyl ion, nitrate ion, sulfate ion, an alkylsulfate ion, sulfonate ion or an alkylsulfonate ion.

<Polyester>

The polyester constituting the base film of the antistatic polyester film of the present invention is a linear polyester composed of a dicarboxylic acid component and a glycol component.

The dicarboxylic acid component is, for example, terephthalic acid, isophthalic acid, 2,6-naphthalenedicarboxylic acid, hexahydroterephthalic acid, 4,4'-diphenyldicarboxylic acid, adipic acid, sebacic acid or dodecanedicarboxylic acid and, especially preferably terephthalic acid or 2,6-naphthalenedicarboxylic acid.

The glycol component is, for example, ethylene glycol, diethylene glycol, propylene glycol, 1,3-propanediol, 1,4-butanediol, neopentyl glycol, 1,5-pentanediol, 1,6-hexanediol, 1,4-cyclohexanedimethanol, polyethylene glycol or polytetramethylene glycol and especially preferably ethylene glycol.

Polyethylene terephthalate or polyethylene 2,6-naphthalate is preferable among the above polyesters to give a film having excellent mechanical properties (e.g. Young's modulus) and thermal properties (e.g. thermal dimensional stability).

The above polyesters may be polyester copolymers copolymerized with the above dicarboxylic acid component and/or glycol component as third components or a polyester copolymers copolymerized with a small amount of a three or more functional polybasic carboxylic acid component and/or polyol component in an amount to form an essentially linear polyester (for example 5 mol % or less).

The polyester of the present invention can be produced by a conventional method and there is no restriction on the production method.

For example, in the case of polyethylene terephthalate, the polyester can be produced preferably by esterifying terephthalic acid, ethylene glycol and as necessary a copolymerizing component and subjecting the produced reaction product to polycondensation reaction or by carrying out ester interchange reaction of dimethyl terephthalate with ethylene glycol and, as necessary, a copolymerizing component and subjecting the produced reaction product to polycondensation reaction.

The intrinsic viscosity of the polyester is preferably 0.45 or above to get a substrate film having desirable mechanical properties (especially rigidity).

The intrinsic viscosity of the polyester was measured in o-chlorophenol at 35° C.

The polyester may be incorporated with a lubricant consisting of organic or inorganic fine particles having an average particle diameter of about 0.01 to 2.0 μm in an amount of for example 0.001 to 5 percent by weight to improve the slipperiness of the obtained antistatic film. Concrete examples of preferable fine particles are silica, alumina, kaolin, calcium carbonate, calcium oxide, titanium oxide, graphite, carbon black, zinc oxide, silicon carbide, tin oxide, crosslinked acrylic resin particles, crosslinked polystyrene particles, melamine resin particles and crosslinked silicone resin particles.

The polyester may be incorporated, in addition to the above additives, with colorants, known antistatic agents, antioxidants, organic lubricants (slip agent), catalysts, fluorescent brighteners, plasticizers, crosslinking agents, ultraviolet absorbers, other resins, etc.

<Base Film>

A transparent polyester film or a white polyester film can be used as the base film of the antistatic film of the present invention according to the use of the antistatic film. The light transmittance of the transparent polyester film is preferably not less than 60%, especially not less than 80% after drawing. The white polyester film is the above polyester compounded with 5 to 30% by weight of titanium oxide, barium sulfate, silicon dioxide, etc., and has a light transmittance of preferably less than 60%, especially 30% or less in drawn state. The white antistatic film produced by using a white polyester film as the base film is especially preferable for a magnetic card, etc.

<Antistatic Agent (A)>

In the present invention, an antistatic layer containing an antistatic agent (A) composed mainly of a polymer having a recurring unit expressed by the following formula (I) is applied to at least one surface of a polyester film.

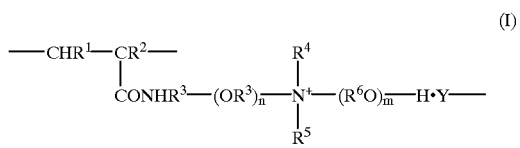

In the formula (I), $R^1$ and $R^2$ are each H or $CH_3$, $R^3$ is an alkylene group having a carbon number of 2 to 10, $R^4$ and $R^5$ are each a saturated hydrocarbon group having a carbon number of 1 to 5, $R^6$ is an alkylene group having a carbon number of 2 to 5, n is a number of 0 to 40, m is a number of 1 to 40, and $Y^-$ is a halogen ion, a mono- or polyhalogenated alkyl ion, nitrate ion, sulfate ion, an alkylsulfate ion, sulfonate ion or an alkylsulfonate ion.

A compound of the formula (I) wherein $Y^-$ is an alkylsulfonate ion expressed by $R^9SO_3^-$ ($R^9$ is a saturated hydrocarbon group having a carbon number of 1 to 5) and $R^6$ is ethylene group is preferable among the above-mentioned antistatic agents (A) because of high adhesivity of the antistatic layer to the polyester film and heat-resistance of the antistatic layer and excellent antistaticity.

More preferable compound is the compound of the formula (I) wherein $Y^-$ is $CH_3SO_3^-$, $C_2H_5SO_3^-$ or $C_3H_7SO_3^-$, $R^6$ is ethylene group and m is 1 to 10.

Furthermore, the antistatic agent (A) of the formula (I) wherein $R^3$ is ethylene group is preferable when the number n is 1 to 40.

The antistatic agent (A) can be produced preferably e.g. by the following method.

An acrylic acid ester monomer is polymerized by emulsion polymerization to obtain a polyacrylic acid ester having a weight-average molecular weight of 2,000 to 100,000, the obtained polymer is amidated by reacting with an N,N-dialkylaminoalkylamine (e.g. N,N-dimethylaminopropylamine or N,N-diethylaminopropylamine) and finally the product is subjected to a quaternary hydroxyalkylation reaction to introduce a quaternary cation pair.

The average molecular weight (number-average molecular weight) of the antistatic agent (A) is arbitrary, however, it is preferably 3,000 to 300,000, especially 5,000 to 100,000. When the average molecular weight is less than 3,000, the back transfer resistance of the antistatic film becomes poor and when the molecular weight exceeds 300,000, the viscosity of the aqueous coating liquid becomes too high to enable the uniform application to the base film.

<Binder Resin (B)>

The antistatic layer of the present invention preferably contains a binder resin (B) to improve the adhesivity of the antistatic layer to the polyester film. Examples of the binder resin (B) are polyester resin (B-1), acrylic resin (B-2) and acryl-modified polyester resin (B-3) and one or more resins selected from the examples are preferably used as the binder resin. The use of the polyester resin (B-1) or the acrylic resin (B-2) is more preferable to improve the adhesivity of the antistatic layer to the polyester film. The combined use of the polyester resin (B-1) with the acrylic resin (B-2) is especially preferable to attain high adhesivity and suppress the color development of a reclaimed film in the case of reclaiming and reusing the waste antistatic film. The amount of the polyester resin (B-1) is preferably larger than that of the acrylic resin (B-2) in the case of using the polyester resin (B-1) in combination with the acrylic resin (B-2).

<Polyester Resin (B-1)>

The polyester resin (B-1) is a linear polyester containing a dicarboxylic acid component and a glycol component as constituent components.

The preferable examples of the dicarboxylic acid component are terephthalic acid, isophthalic acid, 2,6-naphthalenedicarboxylic acid, 4,4'-diphenyldicarboxylic acid, adipic acid, sebacic acid, dodecanedicarboxylic acid and hexahydroterephthalic acid.

The preferable examples of the glycol component are ethylene glycol, diethylene glycol, propylene glycol, 1,3-propanediol, 1,4-butanediol, neopentyl glycol, 1,5-pentanediol, 1,6-hexanediol, dipropylene glycol, triethylene glycol, an alkylene oxide adduct of bisphenol A, an alkylene oxide adduct of hydrogenated bisphenol A, 1,4-cyclohexane-dimethanol, polyethylene glycol and polytetramethylene glycol.

The polyester resin (B-1) may be copolymerized, in addition to the above components, with a component having a sulfonic acid salt group to impart the resin with hydrophilicity. The dispersibility in a water-based coating liquid can be improved by imparting the polyester resin (B-1) with hydrophilicity. Such component is, for example, 5-Na sulfoisophthalic acid or 5-K-sulfoisophthalic acid.

The polyester resin (B-1) may be copolymerized with a small amount of a three or more functional polyvalent compound in an amount within a range to get an essentially linear polyester resin (for example 5 mol % or less). Such three or more functional polyvalent compound is e.g. trimellitic acid, pyromellitic acid, dimethylolpropionic acid, glycerol or trimethylolpropane.

<Acrylic Resin (B-2)>

The acrylic resin (B-2) is a polymer or copolymer composed mainly of acrylic monomers exemplified by ethyl acrylate, methyl acrylate, acrylic acid, butyl acrylate, sodium acrylate, ammonium acrylate, ethyl methacrylate, methyl methacrylate, methacrylic acid, butyl methacrylate, glycidyl methacrylate, 2-hydroxyethyl acrylate, acrylamide, methacrylamide, N-methoxymethyl acrylamide or N-methylol acrylamide. It may be a copolymer copolymerized, in addition to the above monomers, with copolymer components such as styrene, α-methylstyrene, sodium styrenesulfonate, vinyl chloride, vinylidene chloride, vinyl acetate, vinyl ether, sodium vinylsulfonate, sodium methacrylate, butadiene or isoprene.

The second order transition point of the acrylic resin (B-2) forming the antistatic layer is preferably 20 to 100° C. An acrylic resin (B-2) having a second order transition point of lower than 20° C. may have poor blocking resistance, and the chipping resistance may be deteriorated when the second order transition point exceeds 100° C.

The blocking resistance is the resistance to develop the mutual adhesion (blocking) of films in the case of storing a continuous film in a form wound in a roll, and the chipping resistance is the resistance of the separation (chipping) of the antistatic layer from the base polyester film when the antistatic film is subjected to friction or pressing force with a roll in processing.

<Acryl-modified polyester Resin (B-3)>

The aforementioned acryl-modified polyester resin (B-3) is a graft copolymer produced by the copolymerization of the monomer of the above polyester resin (B-1) with acrylic monomers exemplified by ethyl acrylate, methyl acrylate, acrylic acid, butyl acrylate, sodium acrylate, ammonium acrylate, ethyl methacrylate, methyl methacrylate, meth-acrylic acid, butyl methacrylate, glycidyl methacrylate, 2-hydroxyethyl acrylate, acrylamide, methacrylamide, N-methoxymethylacrylamide and N-methylol acrylamide and may contain other monomers such as styrene, α-methylstyrene, sodium styrenesulfonate, vinyl chloride, vinylidene chloride, vinyl acetate, vinyl ether, sodium vinylsulfonate and sodium methacrylate in addition to the above monomers as copolymerizing components.

The antistatic layer of the present invention may be incorporated with a binder resin other than the aforementioned resins to control the adhesivity between the coating film and the polyester film. Examples of the binder resins are polyurethane resin, epoxy resin, vinyl resin, polyether resin and water-soluble resin.

<Crosslinking Agent (C)>

The antistatic layer of the present invention is preferably incorporated with a crosslinking agent (C) composed mainly of a polymer having the recurring unit of the structure expressed by the following formula (II) in order to improve the solvent resistance of the coating film or the blocking resistance of the antistatic film.

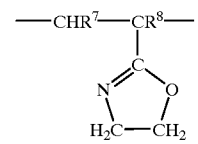

In the formula (II), $R^7$ and $R^8$ are each H or $CH_3$.

The molecular weight of the polymer having the recurring unit of the structure expressed by the formula (II) is preferably between 500 and 5,000. The solvent resistance of the antistatic layer or the blocking resistance of the film may be lowered when the molecular weight is smaller than 500, and a polymer having a molecular weight exceeding 5,000 may cause the failure in getting a uniform antistatic layer.

Among the polymers having the recurring unit of the structure expressed by the formula (II), especially preferable polymers are those containing the recurring unit of the formula (II) wherein groups $R^7$ and $R^8$ are H and $CH_3$, respectively and having a molecular weight of about 2,000.

<Surfactant (D)>

The antistatic layer of the present invention is preferably formed by coating a base film with a coating liquid, especially a water-based coating liquid, containing the aforementioned antistatic agent (A) and optionally the binder resin (B) or the crosslinking agent (C).

The coating liquid is preferably incorporated with a surfactant for improving the stability of the coating liquid, especially the water-based coating liquid, and improving the wettability of the liquid in the case of applying the coating liquid to the base film.

The surfactant (D) is, for example, a nonionic surfactant such as an alkylene oxide homopolymer, an alkylene oxide copolymer, an addition product of an aliphatic alcohol and an alkylene oxide, an addition polymer of a phenolic compound substituted with a long-chain aliphatic group and an alkylene oxide, a polyhydric alcohol fatty acid ester and a long-chain aliphatic amide alcohol, or a cationic or anionic surfactant such as a compound having quaternary ammonium salt, a compound having alkylpyridinium salt or a compound having sulfonic acid group. Among the above compounds, nonionic surfactants, especially polyoxyethylene nonylphenyl ether is most preferable.

<Composition of Coating Liquid>

The antistatic layer of the present invention is preferably formed by coating a base film with a coating liquid, especially a water-based coating liquid, containing the aforementioned antistatic agent (A) and optionally the binder resin (B), the crosslinking agent (C) and/or the surfactant (D).

The coating liquid preferably has a solid composition consisting of 5 to 100% by weight of the antistatic agent (A) and 0 to 95% by weight of the binder resin (B). The antistaticity of the antistatic polyester film frequently becomes insufficient when the content of the antistatic agent (A) is less than 5% by weight.

The following compositions (α), (β) and (γ) are preferable examples of the solid composition of the coating liquid.

(α): 1. 5 to 99% by weight of an antistatic agent (A) (a polymer having the recurring unit of the structure expressed by the aforementioned formula (I))
2. 0 to 95% by weight of a binder resin (B)
3. 1 to 15% by weight of a crosslinking agent (C) (a polymer having the recurring unit of the structure shown by the aforementioned formula (II)), (β): 1. 10 to 80% by weight of the antistatic agent (A) (a polymer having the recurring unit of the structure expressed by the aforementioned formula (I) and having a weight-average molecular weight of 3,000 to 300,000 (in the formula (I), $R^1$ and $R^2$ are each hydrogen atom or methyl group, $R^3$ is an alkylene group having a carbon number of 2 to 10, $R^4$ and $R^5$ are each a saturated hydrocarbon group having a carbon number of 1 to 5, $R^6$ is ethylene group, and $Y^-$ is an alkylsulfonate ion expressed by $R^9SO_3^-$ (wherein $R^9$ is a saturated hydrocarbon group having a carbon number of 1 to 5)),
2. 20 to 80% by weight of a binder resin (B) (an acrylic resin having a second order transitino point of 20 to 100° C.),
3. 0 to 25% by weight of a surfactant (D) and (γ) 1. 10 to 80% by weight of a surfactant (A) (a polymer having the recurring unit of the structure expressed by the formula (I) and having a weight-average molecular weight of 3,000 to 300,000 (in the formula (I), $R^1$ and $R^2$ are each hydrogen atom or methyl group, $R^3$ and $R^6$ are each an ethylene group, $R^4$ and $R^5$ are each a saturated hydrocarbon group having a carbon number of 1 to 5, and $Y^-$ is an alkylsulfonate ion expressed by $R^9SO_3^-$ (wherein $R^9$ is a saturated hydrocarbon group having a carbon number of 1 to 5)),
2. 19 to 80% by weight of a binder resin (B) (an acrylic resin having a second order transition point of 20 to 100° C.)
3. 1 to 10% by weight of a crosslinking agent (C) (a polymer having the recurring unit of the structure expressed by the formula (II)),
4. 0 to 25% by weight of a surfactant (D).

Among the above preferable examples of the solid composition of the coating liquid, especially preferable compositions are the compositions (β) and (γ) giving an antistatic layer having a surface energy of 37 to 73 dyne/cm and a water contact angle of 40 to 110 degrees to improve the adhesivity of the antistatic layer to the base film and get an antistatic film having excellent blocking resistance, heat-resistance and antistaticity at a low humidity in the case of using the antistatic polyester film e.g. as a magnetic card.

The surface energy of the antistatic layer is measured in conformity with JIS K6768 by measuring a wettability index with a wettability index liquid and using the index as the surface energy.

The contact angle with water is measured by setting a specimen film on a contact angle measuring instrument (product of Elmer Co.) directing the measuring face upward, dropping a water drop at 23° C. and measuring the contact angle after 1 minute.

An antistatic layer having a surface energy of 37 to 73 dyne/cm and a water contact angle of 40 to 110 degrees is especially preferable because of excellent antistaticity and adhesivity between the antistatic film and an ultraviolet-curable ink. The antistatic coating film giving an antistatic layer having the surface energy and the water contact angle falling within the above ranges can be produced by adding an antistatic agent (A), a binder resin (B), a crosslinking agent (C) and a surfactant (D) to obtain a solid composition falling within the aforementioned composition ranges (α), (β) or (γ).

For example, since an antistatic agent (A) has an action to increase the surface energy of an antistatic layer, the energy is adjusted within the above range by compounding a binder resin (B) and, as necessary, adding a surfactant (D). Since an antistatic agent (A) also acts to decrease the water contact angle of the antistatic layer, the angle is adjusted within the above range by compounding a binder resin and, as necessary, adding a surfactant (D).

Further, the coating liquid may be compounded with a lubricant in the present invention to improve the surface slipperiness of the antistatic layer and the anbiblocking property of the antistatic film.

The lubricant is fine particles of e.g. a polystyrene, an acrylic resin, a melamine resin, a silicone resin, a fluororesin, a urea resin, a benzoguanamine resin, a polyamide resin or a polyester resin. These resins may be thermoplastic resin or thermosetting resin provided that the resin is present in the antistatic coating film in the form of fine particles.

The coating liquid may be compounded with additional ingredients such as an antistatic agent other than the aforementioned antistatic agent (A), a crosslinking agent other than the aforementioned crosslinking agent (C), a surfactant other than the aforementioned surfactant (D), an antioxidant, a colorant, a pigment, a fluorescent brightener, a plasticizer, a wax, and an ultraviolet absorber.

The solid concentration of the coating liquid is preferably 1 to 30% by weight, especially 2 to 20% by weight. A coating liquid having a solid concentration falling within the above range has a viscosity suitable for application. The coating liquid to be used in the present invention is preferably a water-based coating liquid, which is usable in an arbitrary form such as an aqueous solution, an aqueous dispersion or an emulsion. The water-based coating liquid may contain a small amount of an organic solvent.

<Production of Antistatic Film>

The antistatic polyester film of the present invention can be produced by conventional processes. For example, it can be produced by melting the aforementioned polyester, extruding the molten polyester on a cooling drum in the form of a sheet to form an undrawn film and drawing the undrawn film by a successive biaxial drawing method comprising the drawing of the undrawn film in longitudinal direction and then in transversal direction or by a simultaneous biaxial drawing method comprising the drawing of the undrawn film in the longitudinal direction and the transversal direction at the same time. The biaxially drawn film may be drawn further in longitudinal direction and/or transversal direction. The drawing is preferably carried out at a temperature higher than the second order transition point (Tg) of the polyester at a draw ratio of 2.5 or more, especially 3 or more in each direction. The areal draw ratio is preferably 8 or more, especially 9 or more. The upper limit of the areal draw ratio depends upon the use of the film and is preferably 35, especially 30. The drawn film is preferably heat-treated after drawing to complete the orientation and crystallization of the film.

In the present invention, it is preferable that at least one surface of the polyester film is coated with the aforementioned coating liquid, the coating liquid is dried by heating and the film is drawn to form an antistatic layer. The coating with the coating liquid can be carried out by an arbitrary conventional coating process.

The coating process is, for example, gravure coating, reverse roll coating, die coating, kiss coating, reverse kiss coating, offset gravure coating, Meyer bar coating, roll brush coating, spray coating, air knife coating, impregnation or curtain coating or their combination.

The application amount of the coating liquid is preferably 1 to 20 g, especially 2 to 12 g per 1 m² of the running film. The drying is easy and the coating uniformity is improved when the application amount is within the above range.

The polyester film to be coated with the coating liquid in the present invention is a drawable polyester film such as (a) an undrawn film produced by forming a film from molten polyester as it is, (b) a uniaxially drawn film produced by drawing an undrawn film either in longitudinal direction (direction of length) or in transversal direction (direction of width), (c) a (further drawable) biaxially drawn film produced from a uniaxially drawn film drawn in longitudinal direction or transversal direction by successively drawing the uniaxially drawn film in transversal direction or longitudinal direction, or (d) a (further drawable) biaxially drawn film produced by the simultaneous drawing of an undrawn film in longitudinal and transversal directoins.

The coating liquid is preferably applied to the uniaxially drawn film (b), especially a film uniaxially drawn in longitudinal direction among the above drawable polyester films to ensure the firm bonding of the antistatic coating film and improve the production efficiency of the antistatic polyester film.

The coating liquid applied to the base film is dried preferably at 80 to 160° C. in the present invention to effect quick drying of the coating liquid. The heating in the drawing of the polyester film may be used also for the drying of the coating liquid. The heat-treatment temperature of the polyester film is 180 to 250° C.

The thickness of the antistatic layer applied by the aforementioned method is preferably 0.005 to 3 µm, especially 0.01 to 1 µm. A coating film thinner than 0.005 µm may cause insufficient antistaticity and thicker than 3 µm may form an easily peelable coating film.

<Film Laminate>

The antistatic polyester film of the present invention is useful for magnetic card and a white antistatic polyester film produced by using a white polyester film as the base film is especially preferable for magnetic card.

The magnetic card is a card manufactured by applying a magnetic recording layer (magnetic layer) to a surface of e.g. an antistatic film and a printed layer on the other surface with a UV ink, etc.

The outlines of the constitution of such magnetic card are explained as follows.

First, an antistatic film laminate A is produced by coating a surface of an antistatic polyester film of the present invention with a magnetic coating composed of e.g. magnetic iron oxide, a modified vinyl chloride resin, a polyurethane resin, a polyisocyanate, a dispersing agent, etc., and drying the coating layer to form a magnetic recording layer. The magnetic recording layer of the antistatic film laminate A is preferably further covered with a protection layer.

Subsequently, the surface of the antistatic film laminate A opposite to the surface laminated with the magnetic recording layer, e.g. the surface of the base film coated with the antistatic coating film is printed with an ultraviolet ink produced by compounding a photo-sensitizer, a colorant, etc., e.g. to a polyurethane oligomer having acrylic group on the terminal or a vinyl polymer having acrylic group on the terminal, and the printed ink is cured by ultraviolet irradiation to form an antistatic film laminate B, i.e. a magnetic card.

The thickness of the antistatic polyester film to be used in the magnetic card is e.g. 50 to 300 µm, especially 1.50 to 250 µm to obtain a magnetic card having desirable rigidity.

A transparent antistatic film produced by using a transparent polyester film as the base can be used preferably for a magnetic recording material or an electronic material such as magnetic tape and magnetic disk, a graphic film, a graphic arts film, an OHP film, etc. The thickness of the antistatic polyester film depends upon its use and is preferably e.g. 5 to 160 µm, especially 5 to 100 µm.

EXAMPLES

The present invention is described in detail by the following Examples. The characteristic values were measured and evaluated by the following methods. The average molecular weight cited in the Examples and the Comparative Examples means number-average molecular weight.

1. Surface Resistivity (1) Measurement 1 (Surface resistivity 1)

The surface resistivity of the antistatic layer of an antistatic polyester film was measured by a vibrating reed electrometer (product of Takeda Riken Co., Type TR-84M) after conditioning the specimen film at 21° C. and 52% RH for 19 hours. The applied potential was 100V.

(2) Measurement 2 (Surface resistivity 2)

The surface resistivity of the antistatic layer of an antistatic polyester film was measured by a vibrating reed electrometer (product of Takeda Riken Co., Type TR-84M) after conditioning the specimen film at 23° C. and 60% RH for 19 hours. The applied potential was 500V.

2. Contact Angle with Water

A specimen film was set on a contact angle measuring instrument (product of Elmer Co.) directing the measuring face upward, a waterdrop was dropped on the surface at 23° C. and the contact angle was measured after 1 minute.

3. Back-transfer Resistance

The antistatic layer of an antistatic polyester film was brought into contact with the non-antistatic surface, the laminate was maintained under a condition of 50° C.×70% RH for 8 hours or more, the water contact angle (θ: an alternative characteristic of the back-transfer resistance) of the non-antistatic surface was measured by the method of the preceding item 2, and the back-transfer resistance was evaluated according to the following criterion/

| | | |
|---|---|---|
| A: | θ ≧ 55° | Good back-transfer resistance |
| B: | 55° > θ ≧ 48° | Fair back-transfer resistance |
| C: | 48° > θ | Poor back-transfer resistance |

The water contact angle of a film absolutely free from back-transfer is 60 to 75 degrees, that of a film having good back-transfer resistance is 55 degrees or more and the contact angle of a film exhibiting remarkable back-transfer (poor back-transfer resistance) is less than 48 degrees.

4. Discoloration Tendency of Film (reclaimability)

A film free from antistatic layer was crushed, melted with an extruder at about 300° C. and pelletized. The produced pellets were melted and formed in the form of a film to obtain a blank film. The discoloration tendency of the film was used as the blank. A specimen film having an antistatic layer was crushed, melted with an extruder at about 300° C. and pelletized. The produced pellets were melted and formed in the form of a film to obtain a reclaimed film. The discoloration degree of the film was compared with that of the blank film and evaluated by the following criterion.

Rank A: The discoloration degree is comparable to the blank film.

Rank B: The film is faintly tinted.

Rank C: The film is remarkably tinted and unsuitable for practical use.

5. Saturated Electrostatic Voltage

A voltage of 10 KV was applied to the antistatic layer of a specimen film conditioned under a condition of 22° C. ×44% RH for 10 hours, the electrostatic voltage of the surface of the antistatic layer was measured with time until the change in the electrostatic voltage became unnoticeable, and the voltage was used as the saturated electrostatic voltage. The film was evaluated from the value of the saturated electrostatic voltage by the following criterion.

Rank A: 1 KV≧saturated electrostatic voltage (no problem for practical use)

Rank B: 2 KV≧saturated electrostatic voltage>1 KV (causes some difficulty in practical use)

Rank C: saturated electrostatic voltage>2 KV (difficult for practical use)

6. Ink Receptivity

An ultraviolet ink (a mixture of a bisacryl polyurethane oligomer, a photopolymerization initiator, a photosensitizer and a red colorant) was applied to the surface of the antistatic layer of a specimen film at a thickness of 8 μm, the coating layer was cured by ultraviolet irradiation, a cellophane tape was pasted to the surface of the cured ultraviolet ink layer, the cellophane tape is peeled off, the peeling state between the layers was observed, and the ink receptivity was evaluated according to the following criterion.

Rank A: Peeled between the cellophane tape and the ink layer (good ink receptivity)

Rank B: Peeled between the cellophane tape and the ink layer accompanying partial cohesive failure (fair ink receptivity)

Rank C: Peeled between the antistatic layer and the ink layer (poor ink receptivity)

7. Heat-resistance

Twenty two (12) grams of a specimen film having an antistatic layer was melted by heating at 300° C. in nitrogen atmosphere, maintained in the state for 15 minutes and quenched to form a disk-shaped specimen and the discoloration degree of the specimen was observed. Separately, a disk-shaped specimen was prepared from a film free from antistatic layer under the same conditions and used as a blank. The discoloration degree of the specimen was compared with that of the blank and the heat-resistance was evaluated by the following criterion.

Rank A: Colored to an extremely pale yellow color comparable to the color of the blank (good heat-resistance)

Rank B: Colored to pale yellow color slightly denser than the blank (fair heat-resistance)

Rank C: Colored to yellow color denser than the blank (poor heat-resistance)

8. Blocking resistance (1) Measurement 1 (Blocking resistance 1)

The antistatic layer of a specimen film slit to 10 mm width was brought into contact with the non-antistatic surface of the film, the laminate was maintained in the state under a load of 50 kg/cm$^2$ at 50° C. for 10 hours, the peeling force between the antistatic layer and the non-antistatic layer was measured, and the blocking resistance was evaluated according to the following criterion.

Rank A: Peeling force≦7 g (good blocking resistance)

Rank B: 7 g<peeling force≦10 g (rather poor blocking resistance)

Rank C: 10 g≦peeling force (poor blocking resistance)

(2) Measurement 2 (Blocking resistance 2)

The antistatic layer of a specimen film slit to 50 mm width was brought into contact with the non-antistatic surface of the film, the laminate was maintained in the state under a load of 50 kg/cm$^2$ at 60° C. and 80% RH for 17 hours, the peeling force between the antistatic layer and the non-antistatic layer was measured, and the blocking resistance was evaluated according to the following criterion.

Rank A: Peeling force≦10 g (good blocking resistance)

Rank B: 10 g<peeling force≦30 g (rather poor blocking resistance)

Rank C: 30 g≦peeling force (poor blocking resistance)

9. Chipping Resistance

The antistatic layer of a specimen film slit to 20 mm width was brought into contact with a cylindrical stationary bar made of stainless steel and having a diameter of 10 mm, the specimen film was transported over a length of 80 meters under a load of 200 g, the white powder generated from the antistatic layer and deposited on the bar was observed, and the chipping resistance was evaluated by the following criterion.

Rank A: No white powder on the bar (good chipping resistance)

Rank B: Some white powder observable on the bar (rather poor chipping resistance)

Rank C: Large amount of white powder deposited on the bar (poor chipping resistance)

10. Surface Energy

The wettability index was measured in conformity with JIS K6768 using a wettability index liquid and the measured value was used as the surface energy.

Example 1

A polyethylene terephthalate having an intrinsic viscosity of 0.63 (measured in o-chlorophenol at 35° C.) was melted, extruded on a cooling drum in the form of a sheet and drawn 3.6 times in longitudinal direction at 92° C. to obtain a uniaxially draw film.

A surface of the uniaxially drawn film was coated with a water-based coating liquid having the following solid composition and a concentration of 5% by weight using a gravure coater. The coated film was dried at 98° C., drawn 3.8 times in transversal direction at 105° C. and heat-treated to obtain a film having a thickness of 75 μm and coated with an antistatic layer. The thickness of the antistatic layer of the film was 0.34 μm and the light transmittance of the film was 84%. The characteristics of the film were shown in the Table 1.

<Solid composition of the water-based coating liquid>
1. 30% by weight of an antistatic agent (A): a polymer (a-1, average molecular weight: 7,000) having a recurring unit of the structure shown by the formula (I-1) to be described later,
2. 60% by weight of a binder resin: a polyester copolymer (b-1, average molecular weight: 19,700) containing dicarboxylic acid components consisting of terephthalic acid (54 mol %) and isophthalic acid (46 mol %) and glycol components consisting of ethylene glycol (42 mol %), diethylene glycol (12 mol %), neopentyl glycol (41 mol %) and polyethylene glycol (5 mol %),
3. 10% by weight of a surfactant (D): a polyoxyethylene nonylphenyl ether (the number of polyoxyethylene recurring units: 9).

Comparative Example 1

A film was prepared by a method similar to the Example 1 except for the omission of the application of the water-based coating liquid. The characteristics of the produced film are shown in the Table 1.

Examples 2 to 8 and Comparative Examples 2 to 4

Films were prepared by the method similar to the Example 1 except for the variation of the composition of the coating liquid and the thickness of the coating layer to the values shown in the Table 1. The characteristics of these films are shown in the Table 1.

Example 9

A film having a light transmittance of 2% was prepared by a method similar to the Example 1 except for the use of a polyethylene terephthalate having an intrinsic viscosity of 0.65 and containing 12% by weight of titanium dioxide, the film thickness of 150 μm and the composition of the coating liquid and the thickness of the coating layer varied to those described in the Table 1. The characteristics of the film are shown in the Table 1.

Examples 10 and 11

A film was prepared by the method similar to the Example 1 except for the variation of the composition of the coating liquid and the thickness of the coating layer to the values shown in the Table 1. The characteristics of the film are shown in the Table 1.

TABLE 1

| | Antistatic Layer | | | | Characteristics of antistatic film | | | |
|---|---|---|---|---|---|---|---|---|
| | Solid composition of coating liquid (wt %) | | | Thickness of coating film ($\mu$) | Surface resistivity ($\Omega/\square$) | Back transfer resistance | Discoloration of film | saturated static voltage (KV) |
| | Antistatic agent | Binder resin | Surfactant | | | | | |
| Example 1 | (a-1) 30% | (b-1) 60% | (d-1) 10% | 0.10 | $1 \times 10^{10}$ | A | A | 0.1 A |
| Example 2 | (a-1) 20% | (b-1) 70% | (d-1) 10% | 0.15 | $2 \times 10^{10}$ | A | A | 0.2 A |
| Example 3 | (a-2) 30% | (b-1) 60% | (d-1) 10% | 0.10 | $5 \times 10^{10}$ | A | A | 0.2 A |
| Example 4 | (a-3) 30% | (b-1) 60% | (d-1) 10% | 0.10 | $5 \times 10^{9}$ | A | A | 0.1 A |
| Example 5 | (a-4) 40% | (b-1) 50% | (d-1) 10% | 0.15 | $2 \times 10^{10}$ | A | A | 0.2 A |
| Example 6 | (a-1) 30% | (b-2) 60% | (d-1) 10% | 0.10 | $8 \times 10^{9}$ | A | A | 0.1 A |
| Example 7 | (a-1) 30% | (b-3) 60% | (d-1) 10% | 0.10 | $1 \times 10^{10}$ | A | A | 0.1 A |
| Example 8 | (a-1) 30% | (b-4) 60% | (d-1) 10% | 0.10 | $9 \times 10^{9}$ | A | A | 0.1 A |
| Example 9 | (a-1) 30% | (b-1) 60% | (d-1) 10% | 0.10 | $1 \times 10^{10}$ | A | A | 0.1 A |
| Example 10 | (a-1) 30% | (b-1) 60% | (d-1) 10% | 0.30 | $1 \times 10^{9}$ | A | B | 0.0 A |
| Example 11 | (a-1) 60% | (b-1) 30% | (d-1) 10% | 0.05 | $5 \times 10^{10}$ | A | A | 0.2 A |
| Comparative Example 1 | — | — | — | — | $10^{10}<$ | A | A | $\infty$ C |
| Comparative Example 2 | (a-5) 30% | (b-1) 60% | (d-1) 10% | 0.10 | $2 \times 10^{14}$ | A | A | 1.5 A |
| Comparative Example 3 | (a-6) 30% | (b-1) 60% | (d-1) 10% | 0.10 | $1 \times 10^{11}$ | C | A | 0.3 A |
| Comparative Example 4 | — | (b-1) 90% | (d-1) 10% | 0.10 | $10^{10}<$ | A | A | $\infty$ C |

| | Characteristics of antistatic film | | | | | |
|---|---|---|---|---|---|---|
| | Ink receptivity | Heat-resistance | Blocking resistance 1 | Chipping resistance | Surface energy (dyne/cm) | Contact angle (*) (degree) |
| Example 1 | A | A | A | A | 60 | 60 |
| Example 2 | A | A | A | A | 52 | 65 |
| Example 3 | A | A | A | A | 58 | 62 |
| Example 4 | A | A | A | A | 65 | 53 |
| Example 5 | A | A | A | A | 53 | 66 |
| Example 6 | A | A | A | A | 50 | 69 |
| Example 7 | A | A | A | A | 55 | 63 |
| Example 8 | A | A | A | A | 54 | 63 |

TABLE 1-continued

|  | | | | | | |
|---|---|---|---|---|---|---|
| Example 9 | A | A | A | A | 64 | 52 |
| Example 10 | A | A | A | A | 70 | 45 |
| Example 11 | A | A | B | A | 68 | 48 |
| Comparative Example 1 | C | A | A | A | 60 | 59 |
| Comparative Example 2 | A | A | A | C | 68 | 46 |
| Comparative Example 3 | B | B | B | C | 70 | 43 |
| Comparative Example 4 | A | A | A | A | 49 | 70 |

(*) Contact angle of antistatic layer surface with water

Examples 12 to 19 and Comparative Examples 5 to 7

A polyethylene terephthalate (containing 10% by weight of titanium oxide) having an intrinsic viscosity of 0.65 (measured in o-chlorophenol at 35° C.) was melted, extruded on a cooling drum in the form of a sheet and drawn 3.6 times in longitudinal direction at 92° C. to obtain a uniaxially draw film.

A surface of the uniaxially drawn film was coated with a water-based coating liquid having a solid composition shown in the Table 2 and a concentration of 10% by weight using a gravure coater at a rate of 4 g/m². The coated film was dried at 98° C., drawn 3.6 times in transversal direction at 105° C. and heat-treated at 230° C. to obtain a film having a thickness of 100 μm and having an antistatic layer. The characteristics of the film are shown in the Table 2.

In the Example 18, a film was prepared by a method same as the Example 14 except for the use of polyethylene naphthalate in place of polyethylene terephthalate.

In the Comparative Example 7, a film was prepared by the method same as the Example 12 except for the omission of the coating with the water-based coating liquid.

crosslinking agent and (d-1) of the surfactant are the following copolymers, compounds or mixtures.

(a-1) An antistatic agent (average molecular weight: 7,000) having the recurring unit of the structure expressed by the following formula (I-1)

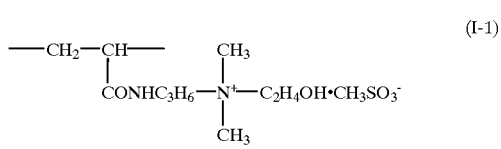

(a-2) An antistatic agent (average molecular weight: 6,500) having the recurring unit of the structure expressed by the following formula (I-2)

TABLE 2

| | Antistatic Layer | | | | | Characteristics of antistatic film | | | | | | |
|---|---|---|---|---|---|---|---|---|---|---|---|---|
| | Solid composition of coating liquid (wt %) | | | | | Surface | Back | | | | | Contact |
| | Antistatic agent | Binder resin | | Cross-linking agent | Surfac-tant | resist-ivity ($\Omega/\square$) | transfer resis-tance | Discolor-ation of film | Ink recep-tivity | Blocking resistance 2 | Chipping resistance | angle (*) (degree) |
| Example 12 | (a-7) 20% | (b-5) 70% | | (c-1) 5% | (d-1) 5% | $5 \times 10^{11}$ | A | A | A | A | A | 65 |
| Example 13 | (a-7) 20% | (b-6) 70% | | (c-1) 5% | (d-1) 5% | $3 \times 10^{11}$ | A | A | A | A | A | 64 |
| Example 14 | (a-7) 30% | (b-5) 30% | (b-6) 30% | (c-1) 5% | (d-1) 5% | $4 \times 10^{11}$ | A | A | A | A | A | 65 |
| Example 15 | (a-8) 30% | (b-5) 30% | (b-6) 30% | (c-1) 5% | (d-1) 5% | $1 \times 10^{11}$ | A | A | A | A | A | 66 |
| Example 16 | (a-7) 7% | (b-5) 42% | (b-6) 41% | (c-1) 5% | (d-1) 5% | $2 \times 10^{12}$ | A | A | A | A | A | 62 |
| Example 17 | (a-7) 48% | (b-5) 21% | (b-6) 21% | (c-1) 5% | (d-1) 5% | $9 \times 10^{9}$ | A | A | A | B | A | 67 |
| Example 18 | (a-7) 30% | (b-5) 30% | (b-6) 30% | (c-1) 5% | (d-1) 5% | $2 \times 10^{11}$ | A | A | A | A | A | 65 |
| Example 19 | (a-7) 20% | (b-5) 65% | | (c-1) 10% | (d-1) 5% | $2 \times 10^{11}$ | A | A | A | A | A | 65 |
| Comparative Example 5 | (a-5) 25% | (b-5) 65% | | (c-1) 5% | (d-1) 5% | $10^{16}<$ | A | A | A | A | C | 42 |
| Comparative Example 6 | (a-6) 25% | (b-5) 65% | | (c-1) 5% | (d-1) 5% | $1 \times 10^{12}$ | C | A | C | C | B | 45 |
| Comparative Example 7 | — | — | — | — | — | $10^{16}<$ | A | A | C | A | A | 65 |

(*) Contact angle of antistatic layer surface with water

In the solid composition of the coating liquid in the Table 1 and the Table 2, the terms (a-1), (a-2), (a-3), (a-4), (a-5), (a-6), (a-7) and (a-8) of the antistatic agent, (b-1), (b-2), (b-3), (b-4), (b-5) and (b-6) of the binder resin, (c-1) of the

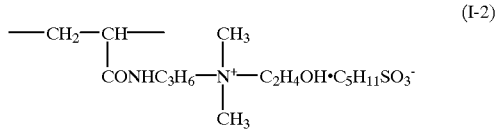

(a-3) An antistatic agent (average molecular weight: 9,000) having the recurring unit of the structure expressed by the following formula (I-3)

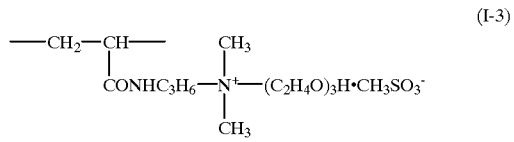

(a-4) A copolymer (average molecular weight: 7,500) composed of 60 mol % of the unit component expressed by the above formula (I-1), 10 mol % of ethyl acrylate and 30 mol % of methyl methacrylate (a-5) A sodium polystyrenesulfonate (sulfonation degree: 98%) (average molecular weight: 20,000)

(a-6) A mixture consisting of 40% by weight of sodium dodecylbenzenesulfonate and 60% by weight of sodium octylsulfate.

(a-7) An antistatic agent (average molecular weight: 15,000) consisting of a polymer having the recurring unit of the structure expressed by the following formula (I-4)

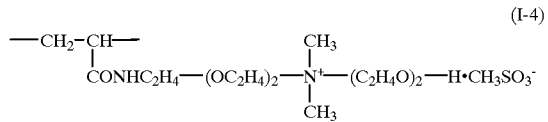

(a-8) An antistatic agent (average molecular weight: 25,000) consisting of a polymer having the recurring unit of the structure expressed by the following formula (I-5)

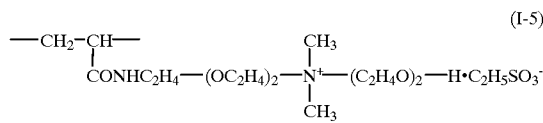

(b-1) A copolymer (average molecular weight: 19,700) containing dicarboxylic acid components consisting of terephthalic acid (54 mol %) and isophthalic acid (46 mol %) and glycol components consisting of ethylene glycol (42 mol %), diethylene glycol (12 mol %), neopentyl glycol (41 mol %) and polyethylene glycol (5 mol %)

(b-2) An acrylic copolymer (average molecular weight: 45,500) composed of methyl methacrylate (51 mol %), ethyl acrylate (39 mol %), hydroxyethyl acrylate (4 mol %) and N-methylol acrylamide (6 mol %)

(b-3) A mixture of 61% by weight of the polyester copolymer (b-1) and 39% by weight of an acrylic copolymer consisting of 16 mol % of ethyl acrylate component, 4 mol % of potassium acrylate component, 53 mol % of methyl methacrylate component, 12 mol % of glycidyl methacrylate component, 7 mol % of 2-hydroxyethyl acrylate component and 8 mol % of N-methoxymethyl acrylamide component.

(b-4) An acryl-modified polyester copolymer (average molecular weight: 41,500) produced by the graft-polymerization of 42% by weight of components consisting of methyl acrylate (19 mol %), ammonium acrylate (8 mol %), ethyl methacrylate (62 mol %) and glycidyl methacrylate (11 mol %) to 58% by weight of the polyester copolymer (b-1).

(b-5) A copolymer (glass transition point: 80° C., average molecular weight: 21,500) of dicarboxylic acid components consisting of terephthalic acid (22 mol %), isophthalic acid (1 mol %), 2,6-naphthalenedicarboxylic acid (65 mol %) and 4,4'-diphenyldicarboxylic acid (12 mol %) and glycol components consisting of ethylene glycol (75 mol %), 1,4-cyclohexanedimethanol (10 mol %) and propylene oxide adduct of bisphenol A (15 mol %).

(b-6) An acrylic copolymer (average molecular weight: 258,000) of methyl methacrylate (30 mol %), ethyl acrylate (55 mol %), acrylonitrile (10 mol %) and N-methylol methacrylamide (5 mol %).

(c-1) A crosslinking agent consisting of a polymer having a recurring unit of the structure expressed by the following formula (II-1)

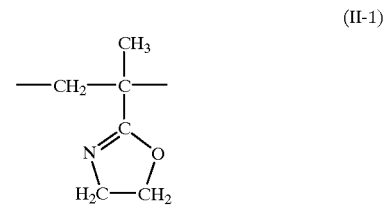

(d-1) A polyoxyethylene nonylphenyl ether (the number of polyoxyethylene recurring units: 9).

INDUSTRIAL APPLICABILITY

It is clear from the tables 1 and 2 that the antistatic films of the examples are excellent in all of antistaticity, back-transfer resistance, reclaimability, chipping resistance and blocking resistance.

What is claimed is:

1. An antistatic polyester film having an antistatic layer formed of an antistatic agent (A) composed mainly of a polymer having a recurring unit of a structure expressed by the following formula (I) on at least one surface of a polyester film

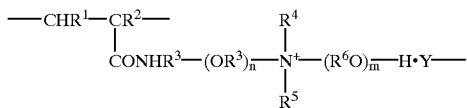

wherein $R^1$ and $R^2$ are each H or $CH_3$, $R^3$ is an alkylene group having a carbon number of 2 to 10, $R^4$ and $R^5$ are each a saturated hydrocarbon group having a carbon number of 1 to 5, $R^6$ is an alkylene group having a carbon number of 2 to 5, n is a number of 1 to 40, m is a number of 1 to 40, $Y^-$ is a halogen ion, a mono- or polyhalogenated alkyl ion, nitrate ion, sulfate ion, an alkylsulfate ion, sulfonate ion or an alkylsulfonate ion.

2. The antistatic polyester film of claim 1 wherein the polyester film is a polyethylene terephthalate film.

3. The antistatic polyester film of claim 1 wherein the polyester film is a polyethylene 2,6-naphthalate film.

4. The antistatic polyester film of claim 1 wherein the ion $Y^-$ in the formula (I) is an alkylsulfonate ion expressed by $R^9SO_3^-$ wherein $R^9$ is a saturated hydrocarbon group having a carbon number of 1 to 5.

5. The antistatic polyester film of claim 1 wherein the group $R^3$ in the formula (I) is ethylene group.

6. The antistatic polyester film of claim 1 wherein the group $R^6$ in the formula (I) is ethylene group.

7. The antistatic polyester film of claim 1 wherein said film is provided with an antistatic layer formed by the application of a coating liquid having a solid composition composed of 5 to 100% by weight of the antistatic agent (A) and 0 to 95% by weight of at least one kind of a binder resin selected from the group consisting of a polyester resin (B-1), an acrylic resin (B-2) and an acryl-modified polyester resin (B-3).

8. The antistatic polyester film of claim 7 wherein said film is provided with an antistatic layer having a surface energy of 37 to 73 dyne/cm and a water contact angle of 40 to 110 degree and formed by coating a base film with a water-based coating liquid, drying the coating layer and drawing the coated film wherein said coating liquid has a solid composition composed of 10 to 80% by weight of the antistatic agent (A), 20 to 80% by weight of the binder resin (B) and 0 to 25% by weight of a surfactant (D) wherein said antistatic agent (A) consists of a polymer having a weight-average molecular weight of 3,000 to 300,000 and contains a recurring unit having a structure expressed by the formula (I) (wherein $R^1$ and $R^2$ are each hydrogen atom or methyl group, $R^3$ is an alkylene group having a carbon number of 2 to 10, $R^4$ and $R^5$ are each a saturated hydrocarbon group having a carbon number of 1 to 5, $R^6$ is ethylene group, and $Y^-$ is an alkylsulfonate ion expressed by the formula $R^9SO_3^-$ ($R^9$ is a saturated hydrocarbon group having a carbon number of 1 to 5, and said binder resin (B) is an acrylic resin (B-2) having a second order transition point of 20 to 100° C.

9. The antistatic polyester film of claim 1 wherein said film is provided with an antistatic layer formed by the application of a coating liquid having a solid composition composed of 5 to 99% by weight of the an antistatic agent (A), 0 to 95% by weight of a binder resin (B), and 1 to 15% by weight of a crosslinking agent (C) composed mainly of a polymer having a recurring unit of a structure expressed by the following formula (II)

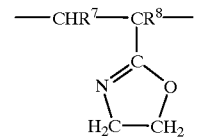

in the formula (II), the groups $R^7$ and $R^8$ are each H or $CH_3$.

10. The antistatic polyester film of claim 9 wherein said film is provided with an antistatic layer having a surface energy of 37 to 73 dyne/cm and a water contact angle of 40 to 110 degree and formed by coating a base film with a water-based coating liquid, drying the coating layer and drawing the coated film wherein said coating liquid has a solid composition composed of 10 to 80% by weight of the antistatic agent (A), 19 to 80% by weight of the binder resin (B), 1 to 10% by weight of a crosslinking agent (C) and 0 to 25% by weight of a surfactant (D) wherein said antistatic agent (A) consists of a polymer having a weight-average molecular weight of 3,000 to 300,000 and contains a recurring unit having a structure expressed by the formula (I) (wherein $R^1$ and $R^2$ are each hydrogen atom or methyl group, $R^3$ and $R^6$ are each ethylene group, $R^4$ and $R^5$ are each a saturated hydrocarbon group having a carbon number of 1 to 5, and $Y^-$ is an alkylsulfonate ion expressed by the formula $R^9SO_3^-$ ($R^9$ is a saturated hydrocarbon group having a carbon number of 1 to 5, and said binder resin (B) is an acrylic resin (b-2) having a second order transition point of 20 to 100° C.

11. The antistatic polyester film of claims 1, wherein said polyester film is a white polyester film having a thickness of 50 to 300 μm and a light transmittance of less than 60%.

12. The antistatic film laminate A produced by laminating a magnetic layer on one surface of the antistatic polyester film described in the claim 11.

13. The antistatic film laminate B having an ultraviolet ink layer on a surface of the antistatic film laminate A described in the claim 12 opposite to the surface laminated with the magnetic layer.

14. The antistatic polyester film of claim 1 wherein said polyester film is a transparent polyester film having a light transmittance of 60% or over.

* * * * *